United States Patent [19]

Thode

[11] Patent Number: 4,894,507

[45] Date of Patent: Jan. 16, 1990

[54] WELDING DEVICE

[76] Inventor: Horst Thode, Holbeinstrasse 41, D-7880 Bad Säckingen, Fed. Rep. of Germany

[21] Appl. No.: 190,006

[22] Filed: May 4, 1988

[51] Int. Cl.[4] .............................................. B23K 11/32

[52] U.S. Cl. ................................ 219/86.7; 219/86.25

[58] Field of Search ................. 219/86.25, 86.7, 117.1, 219/56.1, 56.22

[56] References Cited

U.S. PATENT DOCUMENTS 4,673,786 6/1987 Gött et al. ........................ 219/86.25

4,724,294 2/1988 Klein .................................. 219/86.7

FOREIGN PATENT DOCUMENTS 3247561 6/1984 Fed. Rep. of Germany .

2134023 8/1984 United Kingdom .

*Primary Examiner*—Clifford C. Shaw

*Attorney, Agent, or Firm*—Ostrolenk, Faber, Gerb & Soffen

[57] ABSTRACT

A synchronized device for welding contact pieces onto support material. The device has two electrodes mounted on a housing. The contact pieces and the support material can be separately fed between the electrodes. At least one of the electrodes has an electrode insert for engaging a contact piece resting on the surface of the support material to which the contact piece is to be welded. The electrode can turn around a longitudinal axis which is substantially perpendicular to the surface of the support material to turn a contact piece between the support material and the electrode insert to a desired angular position with respect to the support material. Turning of the electrode is synchronized with the other parts of the device.

11 Claims, 3 Drawing Sheets

WELDING DEVICE

BACKGROUND OF THE INVENTION

1. Field of the Invention

The present invention relates to a welding device for welding contact pieces to support material.

Such welding devices are used for manufacturing high-quality contact parts for electrical and electronic modules.

2. Description of the Related Art

In a known welding device (Federal Republic of Germany OS 32 47 561), the support material is introduced between the electrodes at a predetermined angle to the direction of feed of the contact pieces, and, if the relative angle between the contact pieces and the support material is to be changed, the position of the welding device with respect to the direction of travel of the support material must be reestablished. As a result, a relatively large amount of space is required and it is furthermore not possible for the contact pieces to be welded-on with their longitudinal direction in the direction of movement of the support material. Furthermore, it is difficult, with the known welding devices, to provide the support material with contact pieces on both sides since the contact pieces which have already been welded on the one side of the support material rub on the electrode upon the welding-on of the contact pieces on the opposite side, as a result of which the material of the contact pieces can be damaged.

SUMMARY AND OBJECTS OF THE INVENTION

An object of the present invention is to create a device for welding contact pieces to a support material which makes it possible, without changing the position of the welding device with respect to the direction of travel of the support material, to weld contact pieces onto the support material at any desired angles.

With a welding device in accordance with the invention, it is possible to weld the contact pieces on the support material with their longitudinal axes at any desired angle with respect to the direction of travel of the support material, the longitudinal axes of the contact pieces possibly even lying in the direction of travel of the support material, without having to reset the welding device. With such a device, the contact pieces can be turned, by means of a turnable electrode, to any desired angular alignment with respect to the direction of travel of the support material. For this turning of the contact pieces, electrode inserts can be provided at the end of the electrodes, said inserts having, for instance, a depression for engaging the individual contact pieces so that they can be turned to a certain position.

In accordance with another advantageous feature of the invention, each of the two electrodes are mounted for displacement along their longitudinal axis, so that the electrode which otherwise would come into engagement with a contact piece which has already been welded-on can be lowered to permit the passage, without damage, of contact pieces already welded on the support material.

The feed device for the contact pieces can preferably include a transport slide which comprises a first rod-shaped part which is driven by a control member, a second rod-shaped part which is brought into engagement with one end of a contact piece, and a driver piece. The second rod-shaped part, which comes into engagement with the end of a contact piece and introduces it between the support material and the one electrode, can, in this connection, have a very small cross section which is smaller than or equal to the cross section of the contact piece. Due to the fact that the rod-shaped parts and the driver piece are substantially surrounded on all sides, the second rod-shaped part will not become kinked, even if resistance is opposed to the parts movement.

In accordance with another feature of the invention, the contact pieces can be made from a continuous wire-shaped contact material which is possibly profiled. In this case, the welding device has a cutting device for cutting the contact pieces off from the contact material. This cutting device consists, preferably, of a knife rail which covers a guide channel for the contact material and of a cutting stamp which can be brought, under the control of a control member, completely through the guide channel into cutting engagement with the knife rail. In this way, the use of the otherwise customary reciprocating stamps, which are provided with a passage opening for the contact material and are not regrindable, is dispensed with. The cutting stamp in accordance with the invention can be reground without impairing its dimensional precision. The contact piece which has been cut off by the cutting stamp can furthermore be transferred by the cutting stamp into the path of movement of the second rod-shaped part of the transport slide. Furthermore, the cutting stamp can cooperate with a spring-mounted counterpart which lies opposite it on the side of the knife rail and holds the contact piece fixed firmly on the surface of the cutting stamp.

The device is preferably synchronized by sets of cam discs which move the individual parts of the welding device via control members. In accordance with a preferred embodiment of the invention, two separate cam-disc sets are driven synchronously with each other, one cam disc being provided in each case for the driving of one electrode. In this way, there are a large number for possibilities of controlling the electrodes and the other parts of the welding device.

Other objects and advantages of the present invention will become apparent from the following detailed description of a preferred embodiment in conjunction with the accompanying drawings.

DETAILED DESCRIPTION OF THE PREFERRED EMBODIMENT

Figure 1:
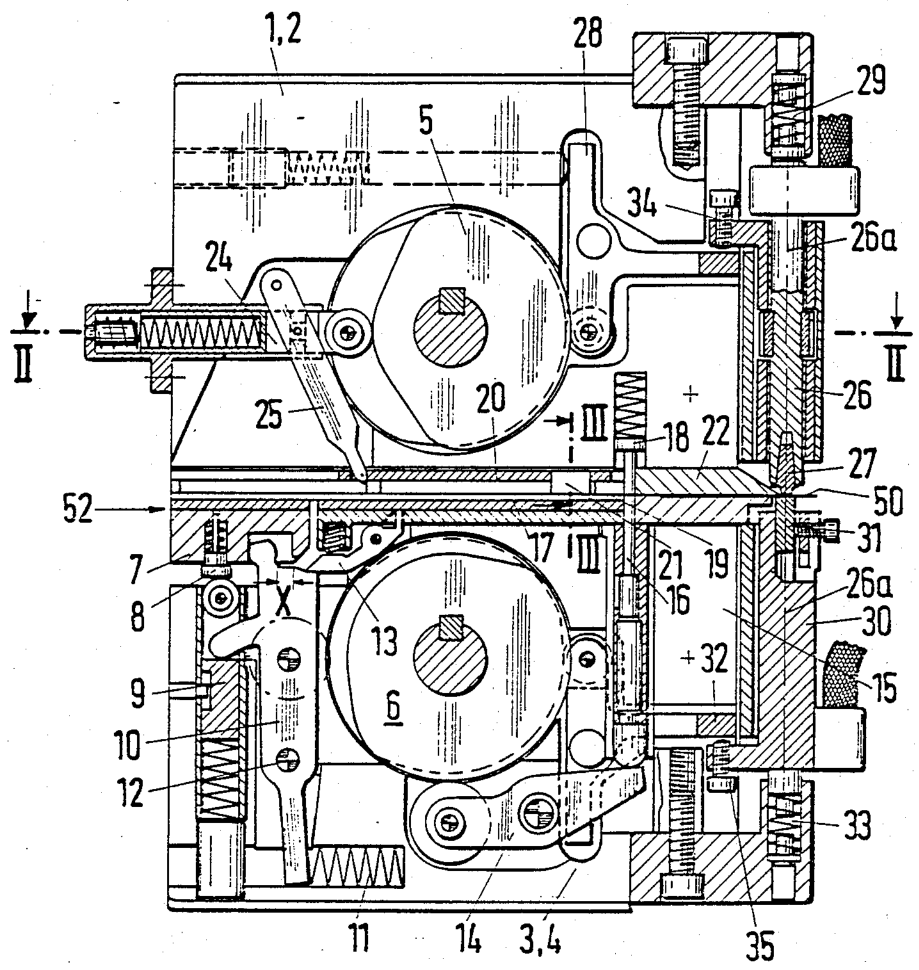
FIG. 1 is a longitudinal section through one embodiment of the welding device, along the line I—I of FIG. 2.

The preferred embodiment has a multipart housing with the parts 1,2,3,4, the parts 1,2 forming an upper housing while the parts 3,4 form a lower housing. As can be noted from FIG. 1, cam-disc sets 5 and 6 are arranged in the upper housing 1,2 and the lower housing 3,4, respectively, for controlling the movement of the welding device. The two sets of cam discs are connected to each other by a belt or chain drive 41, as shown in FIG. 2, and travel in synchronism with each other.

Figure 2:
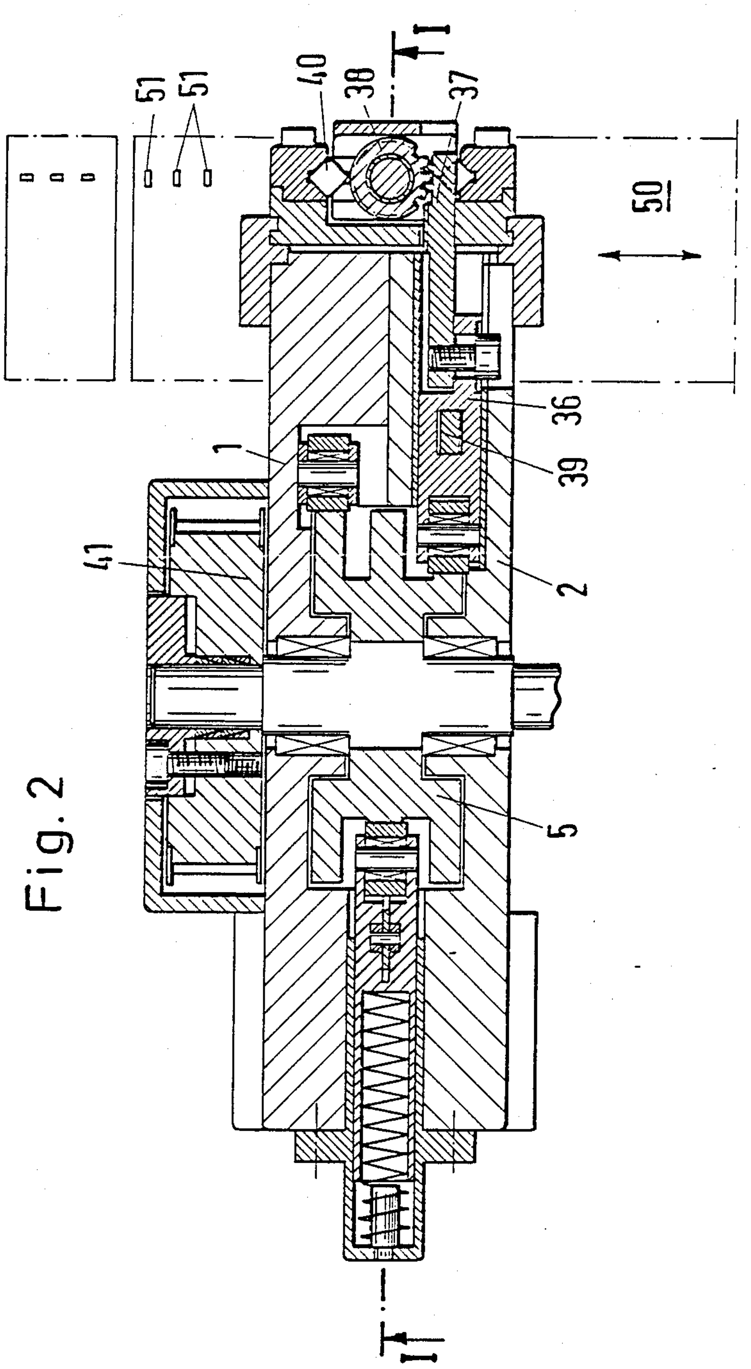
FIG. 2 is a sectional view along the line II—II of FIG. 1.

The contact material 52 is moved, as shown in FIG. 1, by means of an infeed carriage 7 and a clamping piece 8 into a guide channel developed between the housings. The clamping piece 8 is pressed by means of a spring mounted slide 9 against the contact material 52 so that said contact material 52 is pulled in the direction indicated by the arrow, in infinitely adjustable length. A lever 10, which is driven by a cam disc of the set of cam discs 6, around a point of rotation 12 against the action of a spring 11, can move over a first idle path, designated "X", within a recess in the infeed carriage 7, without the infeed slide 7 moving.

During this idle path "X", the spring-urged slide 9 is, first of all, released from a projection present on the lever 10 and clamps the contact material fast via the clamping piece 8. Upon the further movement of the lever 10 in clockwise direction around the center of rotation 12, a retainer clamping lever 13 is lifted off from the contact material by a cam present on the lever 10. At the end of the idle path "X", the lever 10 then comes into engagement with the infeed carriage 7, and moves the latter, and thus the contact material 52, in the direction indicated by the arrow.

Upon the return movement of the lever 10, in counterclockwise direction, the clamping lever 13 is, first of all, released during the movement over the idle path "X" to clamp the contact material, whereupon the clamping by the clamping piece 8 is eliminated and the infeed carriage 7 is moved back into its initial position. By this development of the infeed slide, the infeed device can be driven by a single cam and a single control member, for instance a roller arranged on the lever 10.

After the contact material 52 is pushed forward, a cutting stamp 16, which is mounted adjustably in a slide 15, is move, via another cam of the cam-disc set 6 and a lever 14 forming a control member, through the guide channel for the contact material 52, against a knife rail 17, the portion of the contact material 52 which is present in this part of the guide channel being separated from said material so as to form a contact piece the length of which corresponds to the longitudinal extent of the cutting stamp 16 in the lengthwise direction of the guide channel for the contact material 52. Both the knife rail 17 and the cutting stamp 16 can easily be reground without impairing their dimensional precision.

Upon the cutting off of the contact piece, it is lifted via the cutting stamp into the path of movement of a transport slide having the parts 19 to 21, which will be explained in further detail. In this connection, the contact piece is held against the cutting stamp 16 by a counterpart 18 which is acted on by a spring, said counterpart 18 having a precisely defined stop of its own. without having to regrind the cutting stamp 16, the contact piece which has been cut off thus always reaches an exact position in the path of movement of the transport slide.

Figure 3:
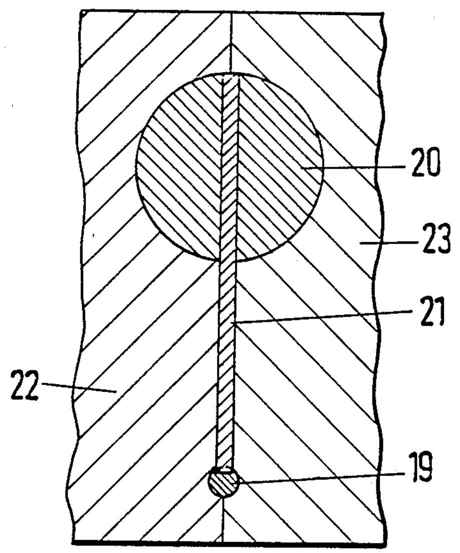
FIG. 3 is an enlarged sectional view along the line III—III of FIG. 1.

This transport slide is driven by a lever arm 25 via a cam disc of the cam-disc set 5 arranged in the upper housing part 1,2, said lever arm 25 forming the control member for the transport slide and being urged against a spring-loaded slide 24 toward the corresponding can disc. The transport slide consists of a first rod-shaped part 20, a driver piece 21, and a second rod-shaped part 19, as can be noted, in particular, from FIG. 3. The parts of the transport slide 19 to 21 are enclosed substantially completely by a guide 22, 23, and the position of the rod-shaped part 19 with respect to the support material 50 in accordance with FIG. 1 determines whether the contact pieces are welded above or below this support material.

The transport slide is developed in three parts, so as to be able to develop the rod-shaped part 19 which comes into engagement with the cut-off contact piece with a cross section which is as small as possible so that, specifically in the case of microprofile contact pieces, the guiding of these contact pieces in the guides 22,23 is not jeopardized by the size of the transport slide.

The rod-shaped part 20, which comes into engagement with the lever 25 is, on the other hand, dimensioned larger and has a slot for engaging the lever 25. This development of the transport slide advantageously prevents the slide from kinking out through the guides 22,23, even in the case of any disturbances and, furthermore, the rod-shaped part 19 can be replaced without substantial expense.

Furthermore, this transport slide, in the manner already indicated, makes possible the transport of the contact pieces 51 below the support material 50 and above the lower electrode 30, if this is desired.

If the transport slide were made larger, transport of the contact pieces below the support material and above the lower electrode, and thus a welding of the contact piece from the bottom onto the support material 50, would not be possible.

Although, in the following, reference is had only to turnability of the upper electrode 26, the lower electrode 30 can also be turned around its longitudinal shaft 26*a*. The turnability of the upper electrode 26 makes it possible to turn the contact piece, introduced by the transport slide 19 to 21 between the electrode 26 and the support material 50, with respect to the direction of transport of the support material 50. For this purpose, the electrode 26, having an electrode insert 27, is lowered via a separate cam disc in the cam disc set 5 by a spring-loaded lever 28 to such an extent over the support material that the contact piece has a clearance of a few hundredths of a millimeter but is nevertheless optimally guided. For this purpose, the electrode insert 27 can be provided with engagement means, for instance a depression the shape of which corresponds approximately to the cross sectional shape of the contact piece.

The turning of the electrode 26 will be explained in further detail below, with reference to FIG. 2.

In the same way as the upper electrode 26, the lower electrode 30 (with its electrode insert 31) is also movable, via a separate cam disc in the cam-disc set 6, a spring loaded lever 26, and a setting spring 33, in the direction of the longitudinal shaft 26*a*. This electrode can thus also be applied against the bottom of the support material 50.

The setting spring 33 is several times stronger than the welding-force spring 29 on the rear end of the electrode 26. When the contact pieces are to be welded from the bottom onto the support material 50, the setting spring 33 can be replaced by a corresponding welding-force spring.

When, after this first setting of the electrodes 26,30, the contact piece 51 has been inserted, in the manner described, between the electrode 26 and the support material 50, the electrode 26 (with the electrode insert 27) is entirely lowered, the lever 28 moves away from a fine-adjustment screw 34 and the welding force is produced exclusively by the welding-force spring 29. At this time, a welding pulse is given over suitable welding-current cables which are connected to the electrodes 26,30.

When a contact piece 51 is to be welded at a predetermined angle between 0 and 90 degrees to the direction of passage of the support material 50, the electrode 26, before its final lowering, is turned, together with the electrode insert 27, via a separate cam disc in the cam-disc set 5, a slide 36, an adjustable rack 37 and a pinion 38 which is rigidly connected to the electrode 26 but insulated from it (FIG. 2) so that the electrode insert 27 turns the contact piece 51 into the predetermined angular position before the welding-force spring 29 enters into action.

After the welding-on, the electrode 26 (with the electrode insert 27) first lifts off via the separate cam disc in the cam-disc set 5, whereupon the electrode 26 is returned to its starting position. The slide 36 is acted on, for this purpose, by a lever 39 which engages in it, only partially shown in FIG. 2, by a spring in the direction towards the cam disc.

Before the support material 50 is transported further, the lower electrode 30 (with the electrode insert 31) is also lifted off from the support material 50 by a lever 37, via a corresponding cam disc in the cam-disc set 6 in the lower housing 3,4.

As is furthermore shown in FIG. 2, both electrodes 26,30 are mounted in roller guides 40 to achieve easy displaceability along their longitudinal axes *26a*.

By the above-described turnability of said at least one electrode it is possible to arrange the contact pieces at any desired angle with respect to the direction of passage of the support material, which, in FIG. 1, is perpendicular to the plane of the drawing. In particular, the longitudinal direction of the contact pieces can even extend parallel to the direction of passage.

When both electrodes 26,30 are longitudinally movable it is furthermore possible to provide the support material 50 with contact pieces on both sides, without the danger of damaging said contact pieces upon the welding-on of the contact pieces provided on the opposite side of the support material 50.

Both electrodes 26,30 are, furthermore, insulated from ground and can possibly be developed in such a manner that they can be cooled.

Although preferred embodiments have been described and illustrated in detail, it is clearly understood that the same is by way of illustration and example only and should not be taken by way of limitation. The spirit and scope of the present invention should be limited only by the terms of the appended claims.

I claim:

1. A device for welding a contact piece onto support material, said device comprising:

two electrodes for welding the contact piece onto the support material, said electrodes being arranged along a longitudinal axis;

first feed means for feeding the support material between said electrodes with the surface of the support material to which the contact is to be welded being fed perpendicular to said longitudinal axis;

second feed means for separately feeding the contact piece between said electrodes and adjacent to the support material;

an electrode insert associated with one of said electrodes for engaging the contact piece when the contact piece is adjacent to the support material;

electrode rotating means for rotating said one of said two electrodes to thereby rotate the contact piece with respect to the support material; and synchronization means for synchronizing said first feed means, said second feed means, and said electrode rotating means.

2. A welding device according to claim 1, wherein both of said electrodes are displaceable along said longitudinal axis.

3. A welding device according to claim 2, wherein said insert includes a depression for receiving the contact piece.

4. A welding device according to claim 3, wherein:

said second feed means comprises:

a transport slide, said slide having a first rod-shaped part;

a control member for driving said part;

a second rod-shaped part for engaging the contact piece, said second part having a cross section which is smaller than or equal to the cross section of the contact piece; and a driver piece for connecting said rod-shaped parts together; and said rod-shaped parts and said driver piece are substantially surrounded by a housing.

5. A welding device according to claim 4, further comprising a cutting device for cutting the contact piece from a wire, said cutting device comprising:

a guide channel;

a knife rail covering said guide channel;

a cutting stamp;

a control member for passing said stamp through said guide channel; and means for bringing said stamp into cutting engagement with said knife rail to cut off the contact piece to a length corresponding to the length of said stamp in the longitudinal direction of said guide channel.

6. A welding device according to claim 5, wherein said stamp further comprises means for bringing the contact piece into the path of said second part of said transport slide.

7. A welding device according to claim 6, further comprising a spring-mounted counterpart disposed opposite from said knife rail for cooperating with said stamp.

8. A welding device according to claim 7, wherein said electrode rotating means includes a rack and pinion located on said one of said electrodes.

9. A welding device according to claim 8, wherein said synchronization means includes:

two sets of cam discs and control members for separately controlling said first and second feed means and said electrodes, said sets of cam discs comprising:

a first cam disc set for controlling said slide and said first electrode; and a second cam disc set for feeding the wire to said transport slide, said cutting device, and said second electrode; and means for synchronously driving said sets together.

10. A welding device according to claim 9, wherein said electrodes are insulated from ground.

11. A welding device according to claim 10, wherein said electrodes are adapted to be cooled.

* * * * *